US010227906B2

(12) United States Patent
McFarland

(10) Patent No.: US 10,227,906 B2
(45) Date of Patent: Mar. 12, 2019

(54) DIESEL EXHAUST FLUID INJECTOR CALIBRATION FREEZE PROTECTION INSERT

(71) Applicant: Continental Automotive Systems, Inc., Auburn Hills, MI (US)

(72) Inventor: Robert Wayne McFarland, Smithfield, VA (US)

(73) Assignee: Continental Powertrain USA, LLC, Auburn Hills, MI (US)

( * ) Notice: Subject to any disclaimer, the term of this patent is extended or adjusted under 35 U.S.C. 154(b) by 187 days.

(21) Appl. No.: 15/215,667

(22) Filed: Jul. 21, 2016

(65) Prior Publication Data

US 2018/0023438 A1 Jan. 25, 2018

(51) Int. Cl.
*F01N 3/20* (2006.01)
*B05B 12/10* (2006.01)
*F02M 61/16* (2006.01)

(52) U.S. Cl.
CPC .............. *F01N 3/206* (2013.01); *B05B 12/10* (2013.01); *F01N 3/2066* (2013.01); *F02M 61/167* (2013.01); *F01N 2610/02* (2013.01); *F01N 2610/1453* (2013.01); *F01N 2610/1486* (2013.01); *F02M 61/165* (2013.01)

(58) Field of Classification Search
CPC ....... B05B 12/10; F01N 3/206; F01N 3/2066; F01N 2610/02; F01N 2610/1453; F01N 2610/1486; F02M 61/167; F02M 61/165
See application file for complete search history.

(56) References Cited

U.S. PATENT DOCUMENTS

| | | | | |
|---|---|---|---|---|
| 6,834,667 | B2 * | 12/2004 | Sumiya | F02M 51/0671 137/15.18 |
| 9,777,859 | B2 * | 10/2017 | van Vuuren | F16K 27/00 |
| 9,790,831 | B2 * | 10/2017 | Stang | F01N 3/208 |
| 2003/0094513 | A1 * | 5/2003 | Luft | F02M 51/0671 239/533.9 |

(Continued)

FOREIGN PATENT DOCUMENTS

| | | | |
|---|---|---|---|
| DE | 102010030925 A1 | 1/2012 | |
| DE | 102010039052 A1 * | 2/2012 | ........... F01N 3/2066 |
| WO | 20130113881 A1 | 8/2013 | |

OTHER PUBLICATIONS

Search Report and Written Opinion of the International Searching Authority dated Nov. 2, 2017 for corresponding International Application No. PCT/US2017/042344.

*Primary Examiner* — Phutthiwat Wongwian
*Assistant Examiner* — Matthew T Largi

(57) ABSTRACT

An injector which incorporates the use of an insert to compensate for the change in volume of diesel exhaust fluid as the diesel exhaust fluid freezes, reducing or eliminating the effects on the calibration of the injector. The calibration freeze protection insert is located adjacent a calibration sleeve in the injector, where the insert is welded to an inlet tube. Any axial forces applied to the calibration sleeve from the blocking force of the freezing diesel exhaust fluid are transmitted to the insert, and the position of the insert is maintained by the welds. The insert and the calibration sleeve are configured to only allow small amounts of diesel exhaust fluid to migrate around the injector components, which is able to be compensated for by the elastic modulus of the various injector components.

20 Claims, 3 Drawing Sheets

(56) References Cited

U.S. PATENT DOCUMENTS

| | | | |
|---|---|---|---|
| 2005/0133639 A1 | 6/2005 | Hornby | |
| 2013/0061578 A1* | 3/2013 | Van Vuuren | F01N 3/2066 60/295 |
| 2014/0338630 A1* | 11/2014 | Hodgson | F01N 3/2066 123/188.1 |
| 2015/0059322 A1* | 3/2015 | Bugos | F01N 3/2066 60/298 |

* cited by examiner

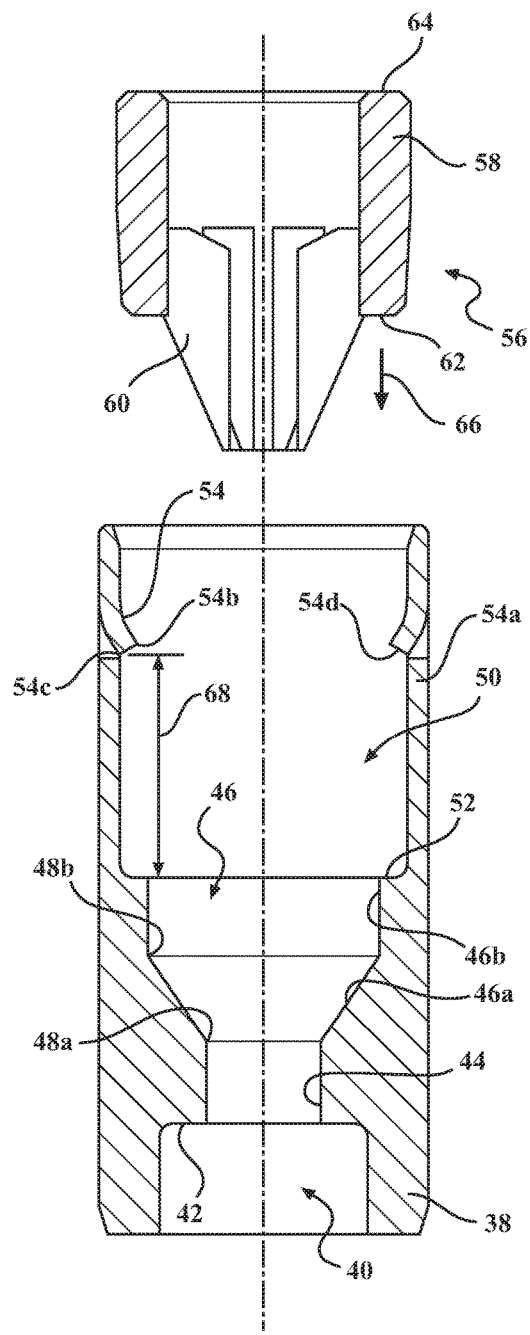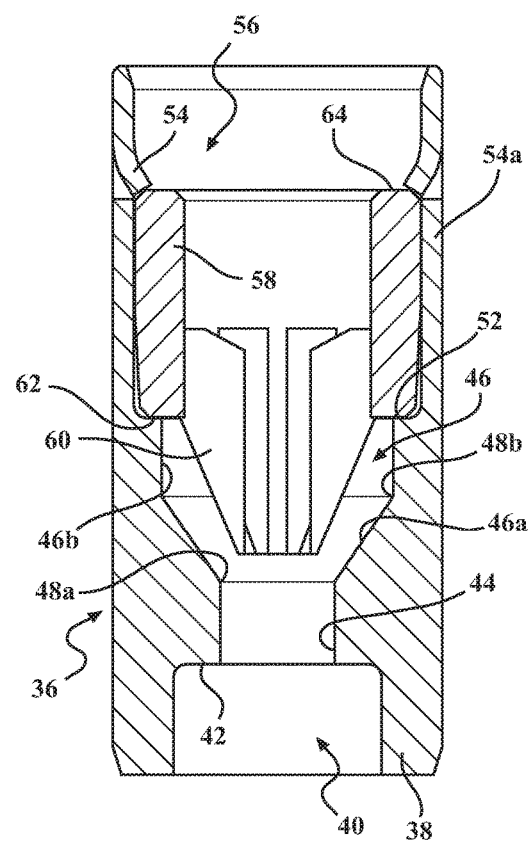
FIG. 4
FIG. 5

DIESEL EXHAUST FLUID INJECTOR CALIBRATION FREEZE PROTECTION INSERT

FIELD OF THE INVENTION

The invention relates generally to an insert used as part of an injector for a selective catalytic reduction system, where the insert prevents a change in the operation of the injector due to the freezing of diesel exhaust fluid.

BACKGROUND OF THE INVENTION

New emissions legislation in Europe and North America is driving the implementation of new exhaust aftertreatment systems, particularly for lean-burn technologies such as compression-ignition (diesel) engines, and stratified-charge spark-ignited engines (usually with direct injection) that are operating under lean and ultra-lean conditions. Lean-burn engines exhibit high levels of nitrogen oxide emissions (NOx), that are difficult to treat in oxygen-rich exhaust environments characteristic of lean-burn combustion. Exhaust aftertreatment technologies are currently being developed that treat NOx under these conditions.

One of these technologies includes a catalyst that facilitates the reactions of ammonia ($NH_3$) with the exhaust nitrogen oxides (NOx) to produce nitrogen ($N_2$) and water ($H_2O$). This technology is referred to as Selective Catalytic Reduction (SCR). Ammonia is difficult to handle in its pure form in the automotive environment, therefore it is customary with these systems to use a liquid aqueous urea solution, typically at a 32% concentration of urea ($CO(NH_2)_2$). The solution is referred to as AUS-32, or diesel exhaust fluid (DEF), and is also known under its commercial name of AdBlue. The DEF is delivered to the hot exhaust stream and is transformed into ammonia in the exhaust after undergoing thermolysis, or thermal decomposition, into ammonia and isocyanic acid (HNCO). The isocyanic acid then undergoes a hydrolysis with the water present in the exhaust and is transformed into ammonia and carbon dioxide ($CO_2$), the ammonia resulting from the thermolysis and the hydrolysis then undergoes a catalyzed reaction with the nitrogen oxides as described previously.

The delivery of the DEF solution to the exhaust involves precise metering of the DEF and proper preparation of the DEF to facilitate the later mixing of the ammonia in the exhaust stream. The delivery of the DEF into the exhaust is typically achieved using some type of injector.

The injector is calibrated during manufacturing to function correctly during the life of the vehicle such that a consistent amount of DEF is injected into the exhaust stream each time the injector is actuated. One approach to achieving the proper calibration is to use a calibration sleeve which is mounted in a specific position to properly position a return spring (which is part of a solenoid unit used for actuating the injector). However, when the vehicle is exposed to different environments and operating conditions, the DEF may freeze, and therefore expand. Injectors are typically expected to operate at temperatures between −40° C. to 160° C. DEF freezes at −11° C., which may occur in cold environments when the vehicle is not in use, and the volume of DEF increases by approximately 9% when frozen. Since the DEF in its liquid form is able to migrate around different parts of the injector, the expansion of the DEF during freezing may cause different components of the injector to shift and deform, or displace permanently, compromising the operation of the injector, and affecting performance. Some injectors incorporate the use of external devices to compensate for this expansion, which add cost and number of components.

Accordingly, there exists a need for an injector which is able to compensate for the increase in volume of frozen diesel exhaust fluid during certain conditions, and still function correctly once the frozen diesel exhaust fluid has returned to liquid form.

SUMMARY OF THE INVENTION

The present invention is an injector which incorporates the use of an insert to compensate for the change in volume of diesel exhaust fluid as the diesel exhaust fluid freezes, reducing or eliminating the effects on the calibration of the injector.

In one embodiment, the present invention is a calibration freeze protection insert which is located adjacent a calibration sleeve in an injector, where the insert is welded to an inlet tube. Any axial forces applied to the calibration sleeve from the blocking force of the freezing diesel exhaust fluid are transmitted to the insert, and the position of the insert is maintained by the welds. The insert and the calibration sleeve are configured to only allow small amounts of diesel exhaust fluid to migrate around the injector components, which is able to be compensated for by the elastic modulus of the various injector components.

In one embodiment, the present invention is an injector having an insert to prevent damage or a change in operation of the injector, due to the freezing of diesel exhaust fluid, where the injector includes an inlet tube configured for receiving diesel exhaust fluid, a pole piece disposed in the inlet tube, a calibration sleeve partially disposed in the pole piece, and an insert disposed in the inlet tube, such that the insert in contact with the calibration sleeve. Under conditions where the diesel exhaust fluid freezes, the diesel exhaust fluid is directed from the calibration sleeve through the insert. The calibration sleeve is connected to the pole piece through a press-fit connection.

The injector also includes a lower aperture formed as part of the calibration sleeve, and a central aperture formed as part of the insert. The diesel exhaust fluid in the lower aperture migrates through the central aperture as the diesel exhaust fluid freezes. In one embodiment, the lower aperture is approximately the same diameter as the central aperture, but it is within the scope of the invention that the lower diameter may be larger or smaller than the central aperture.

A filter assembly is disposed in the insert, and a retention cavity is formed as part of the insert such that a portion of the filter assembly is disposed in the retention cavity when the filter assembly is disposed in the insert.

The injector also includes a retention feature formed as part of the insert, and a ledge portion is formed as part of the insert such that the ledge portion is part of the retention cavity. A body portion is part of the filter assembly, and the body portion is located between the retention feature and the ledge portion when the filter assembly is placed in the insert.

A central cavity is formed as part of the insert, such that the central cavity is adjacent the retention cavity. The filter assembly also includes a filter portion, and the filter portion partially extends into the central cavity when the filter assembly is disposed in the insert.

At least one weld connection provides a connection between the insert and the inlet tube. The weld connections secure the position of the insert relative to the inlet tube, therefore preventing the calibration sleeve from moving, maintaining the proper calibration of the injector.

In an embodiment, an upper surface is formed as part of the calibration sleeve, a contact surface is formed as part of the insert, and the upper surface is in contact with the contact surface when the calibration sleeve and the insert are disposed in the inlet tube. The contact between the calibration sleeve and the insert may be such that the lower aperture and central aperture are in alignment with one another.

The insert may also include a receiving cavity located in proximity to the central aperture such that a portion of the calibration sleeve extends into the receiving cavity when the insert and the calibration sleeve are disposed in the inlet tube, such that the calibration sleeve contacts the insert, and the lower aperture is in substantial alignment with the central aperture.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 4 is a sectional exploded view of an insert and a filter assembly used as part of an injector, according to embodiments of the present invention; and FIG. 5 is a sectional view of a filter assembly connected to an insert used as part of an injector, according to embodiments of the present invention.

DETAILED DESCRIPTION OF THE PREFERRED EMBODIMENTS

The following description of the preferred embodiment(s) is merely exemplary in nature and is in no way intended to limit the invention, its application, or uses.

Figures 1, 2:
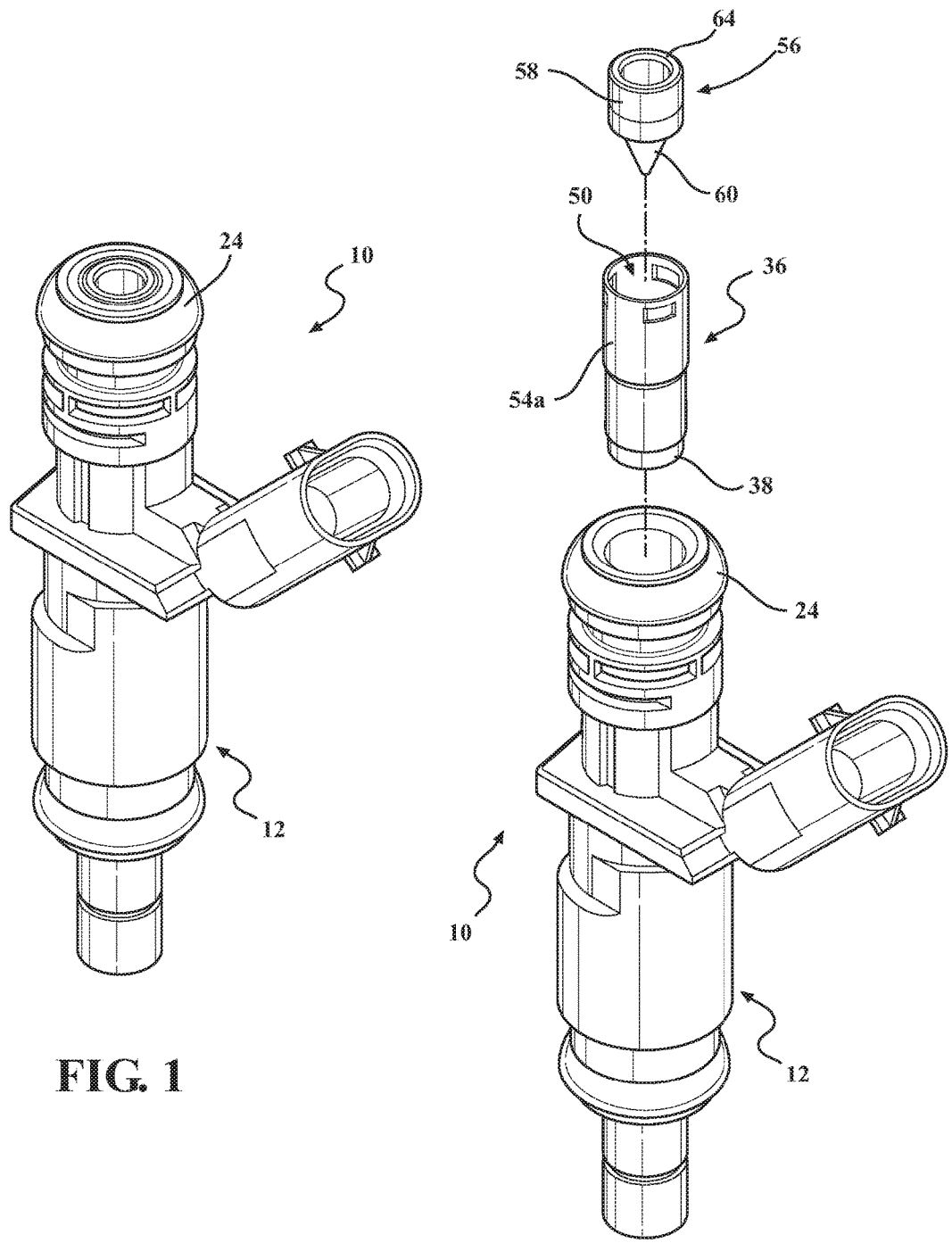
FIG. 1 is a perspective view of an injector having an insert, according to embodiments of the present invention.
FIG. 2 is an exploded view of an injector having an insert, according to embodiments of the present invention.
Figure 3:
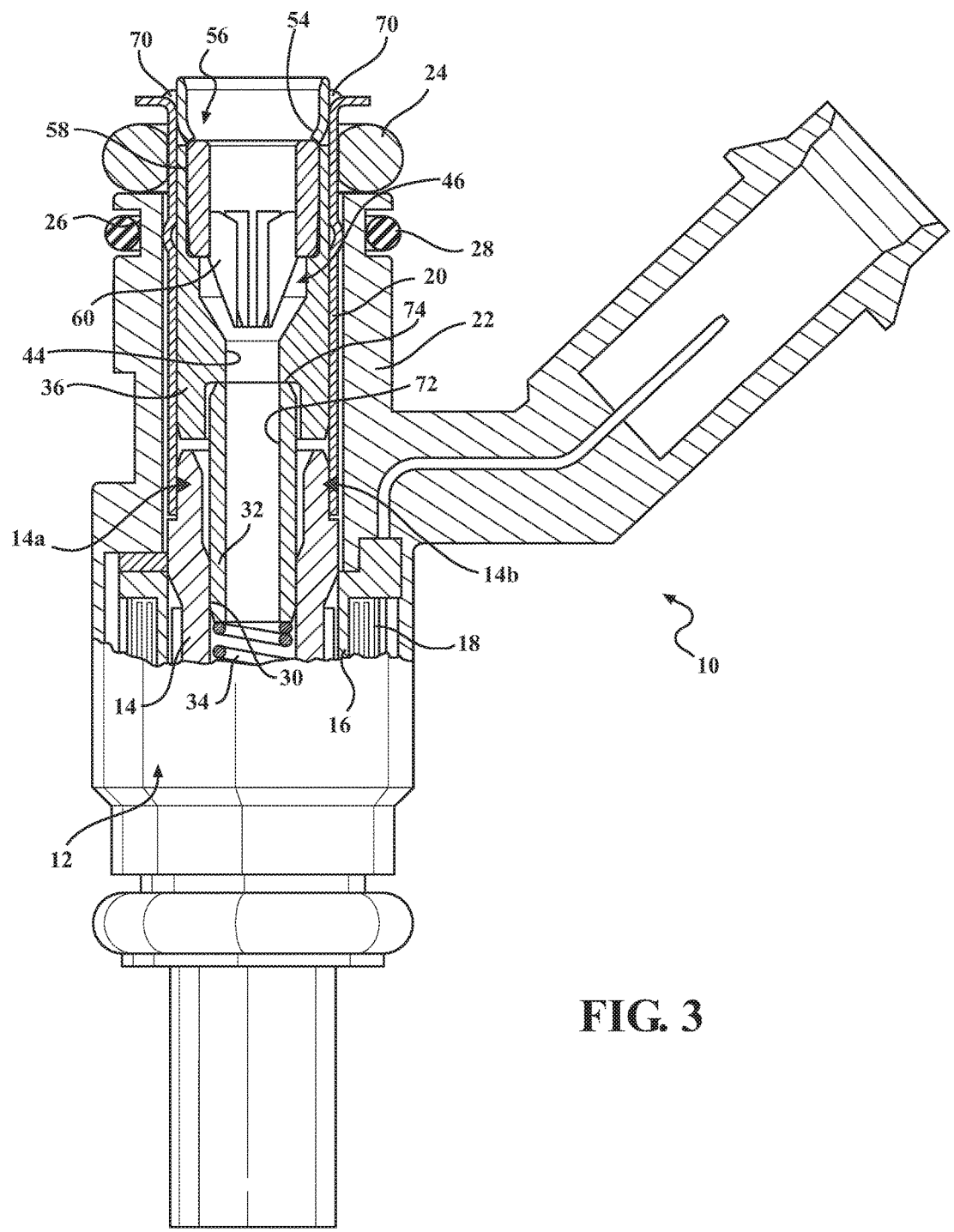
FIG. 3 is a sectional view of an injector having an insert, according to embodiments of the present invention.

An injector having a calibration protection insert is shown in FIGS. 1-5/generally at 10. Referring to the Figures generally, the injector 10 includes an actuator, shown generally at 12, which in this embodiment is a solenoid 12, where the solenoid 12 has a pole piece 14 surrounded by a bobbin 16, and the bobbin 16 is surrounded by a coil 18. The pole piece 14 is welded to an inlet tube 20 as shown by the welds 14a,14b, and the inlet tube 20 is at least partially surrounded by a housing 22. A portion of the inlet tube 20 protrudes out of the housing 22, such that a first O-ring 24 surrounds the inlet tube 20 as shown in FIGS. 1-3. The housing 22 also includes a groove 26, and a second O-ring 28 is disposed in the groove 26.

The pole piece 14 includes an aperture 30, and during assembly, a calibration sleeve 32 is placed in the aperture 30 to apply force to a return spring 34, as part of the calibration process of the injector 10. The calibration sleeve 32 is positioned in the aperture 30 such that the return spring 34 is compressed a desired amount, which may vary from one injector 10 to the next, due to variations in the spring constant of the return spring 34. The position of the calibration sleeve 32 is maintained by a press-fit connection inside the pole piece 14.

The injector 10 also includes an insert 36, which is located in the inlet tube 20 in proximity to the calibration sleeve 32. The insert 36 includes a receiving portion 38 having a receiving cavity, shown generally at 40. The receiving portion 38 is generally circular in shape, and has a larger diameter as compared to the diameter of the calibration sleeve 32. The insert 36 also includes a contact surface 42 which forms part of the cavity 40, and a central aperture 44 which is in fluid communication with the cavity 40. The diameter of the aperture 44 is narrower than the diameter of the cavity 40. In fluid communication with the aperture 44 is a central cavity, shown generally at 46. The cavity 46 includes a tapered portion 46a and a non-tapered portion 46b. The tapered portion 46a includes a small diameter portion 48a, which is approximately the same diameter as the aperture 44, and a large diameter portion 48b, which has approximately the same diameter as the non-tapered portion 46b of the cavity 46.

The insert 36 also includes a retention cavity, shown generally at 50. The retention cavity 50 is larger in diameter than the non-tapered portion 46b of the cavity 46. Formed as part of the retention cavity 50 is a ledge portion 52, and a retention feature 54. The retention feature 54 is a deformation, or crimped, portion of the side wall 54a of the insert 36.

The injector 10 also includes a filter assembly, shown generally at 56, which includes a body portion 58 and a filter portion 60. The body portion 58 also includes a lower mounting surface 62 and an upper mounting surface 64. The filter portion 60 is tapered, and when the filter assembly 56 is connected to the insert 36, part of the filter portion 60 is disposed in the cavity 46, as shown in FIGS. 3 and 5. During assembly, the filter assembly 56 is inserted into the retention cavity 50 in the direction of the arrow 66 shown in FIG. 4, such that the filter assembly 56 is moved towards the cavity 46. The retention feature 54 includes an innermost edge 54b, a lowermost edge 54c, and a retention surface 54d. The diameter of the innermost edge 54b of the retention feature 54 is smaller than the diameter of the body portion 58. Therefore, as the filter assembly 56 is inserted into the retention cavity 50, the body portion 58 causes the retention feature 54 to deflect. The filter assembly 56 is moved in the direction of the arrow 66 until the lower mounting surface 62 contacts the ledge portion 52, and the upper mounting surface 64 has moved past the retention feature 54 such that the retention feature 54 is no longer deflected by the body portion 58 and moves back to the position shown in FIGS. 3 and 5, and the retention surface 54d is in contact with the upper mounting surface 64. The angle of the retention feature 54 and the distance 68 between the lowermost edge 54c and the ledge portion 62 is such that there is an interference fit, or "snap fit" connection between the retention feature 54 and the upper mounting surface 64, where the filter assembly 56 is retained in place and prevented from moving.

The insert 36 is connected to the inlet tube 20 through the use of some type of connection, which in this embodiment is a weld connection 70. However, it is within the scope of the invention that other types of connections may be used. The weld connection 70 is located in proximity to the inlet of the inlet tube 20, and in proximity to the retention feature 54. It is also within the scope of the invention that the weld connection 70 may be located along different areas of the inlet tube 20 and the insert 36, depending on what is best suited for a particular application and construction. Furthermore, the steps taken to assemble the filter assembly 56, the insert 36, and the inlet tube 20 may vary as well. In one embodiment, the insert 36 is placed in the inlet tube 20, and secured with the weld connections 70 prior to the filter assembly 56 being placed and secured into the insert 36. In another embodiment, the filter assembly 56 is placed in the insert 36 prior to the insert 36 being placed into the inlet tube 20. In either embodiment, the calibration sleeve 32 is placed in the pole piece 14 prior to the insert 36 being placed in the inlet tube 20.

The calibration sleeve 32 also includes a lower aperture 72, which is substantially the same diameter as the aperture 44 of the insert 36. When the insert 36 is placed in the inlet tube 20, a portion of the calibration sleeve 32 extends into the cavity 40, such that an upper surface 74 of the calibration sleeve 32 contacts the contact surface 42 of the insert 36, and the aperture 72 of the calibration sleeve 32 is in substantial alignment with the aperture 44 of the insert 36. During operation, DEF flows into the inlet tube 20, through the filter portion 60 into the retention cavity 50, through the aperture 44 of the insert 36, and through the aperture 72 of the calibration sleeve 32. After the DEF has passed through the aperture 72 of the calibration sleeve 32, the DEF then flows towards a valve portion (not shown), where as the injector 10 is actuated, the DEF is injected into an exhaust conduit.

There are conditions where the vehicle is turned off, and the environment is such the DEF may freeze. Since the injector 10 is designed for use in environments having temperatures ranging from −40° C. to 160° C., and DEF freezes at −11° C., it is possible that there may be conditions where the DEF freezes when the vehicle is not in use. As the DEF freezes, the DEF expands, which increases the volume the DEF occupies in the injector 10. As the DEF expands, the DEF in the pole piece 14 migrates though the aperture 72 of the calibration sleeve 32, and through the aperture 44 of the insert 36. This allows for most of the DEF in the injector 10 to expand during freezing without applying any pressure to the components of the injector 10. In some instances, some of the DEF may migrate between the contact surface 42 and the upper surface 74 of the pole piece, and migrate into other areas of the injector 10. However, the amounts of DEF that migrate into other parts of the injector 10 is minimal such that if the DEF expands during freezing, the elastic modulus of the materials of the components of the injector 10, such as the inlet tube 10, the pole piece 14, and the housing 12, are able to compensate for the expansion of the minimal amount of DEF, without damaging or affecting the operation of the injector 10 once the DEF melts back to a liquid. Furthermore, the weld connections 70 secure the position of the insert 36 relative to the inlet tube 20, therefore preventing the calibration sleeve 32 from moving, maintaining the proper calibration of the injector 10.

Another advantage of the present invention is that the insert 36 occupies additional space inside the inlet tube 20, which would otherwise be occupied by DEF if the insert 36 were not used. Less overall DEF in the injector 10 reduces the amount of overall volume expansion of the DEF during freezing, reducing the force applied to the different components of the injector 10 due to DEF expansion during freezing.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. An apparatus, comprising:
   an injector, including:
      an inlet tube for receiving diesel exhaust fluid;
      an insert disposed within and connected to the inlet tube;
      a calibration sleeve disposed within the inlet tube in proximity to the insert;
      wherein as the diesel exhaust fluid freezes, the diesel exhaust fluid expands and is directed into the insert by the calibration sleeve;
      a lower aperture formed as part of the calibration sleeve;
      a central aperture formed as part of the insert;
      wherein the diesel exhaust fluid in the lower aperture creeps through the central aperture as the diesel exhaust fluid freezes; and
      a receiving cavity formed as part of the insert in proximity to the central aperture;
      wherein a portion of the calibration sleeve extends into the receiving cavity when the insert and the calibration sleeve are disposed in the inlet tube, such that the calibration sleeve contacts the insert, and the lower aperture is in substantial alignment with the central aperture.

2. The apparatus of claim 1, further comprising a pole piece disposed within the inlet tube, wherein the calibration sleeve is connected to the pole piece.

3. The apparatus of claim 1, further comprising:
   an upper surface formed as part of the calibration sleeve; and
   a contact surface formed as part of the insert;
   wherein the upper surface is in contact with the contact surface when the calibration sleeve and the insert are disposed in the inlet tube.

4. The apparatus of claim 1, wherein the lower aperture is approximately the same diameter as the central aperture.

5. The apparatus of claim 1, further comprising a filter assembly disposed in the insert.

6. The apparatus of claim 5, the filter assembly further comprising:
   a body portion; and
   a filter portion connected to the body portion;
   wherein the diesel exhaust fluid flows through the body portion and the filter portion prior to flowing through the calibration sleeve.

7. The apparatus of claim 1, further comprising at least one weld connection providing a connection between the insert and the inlet tube.

8. An apparatus, comprising:
   an injector, including:
      an inlet tube for receiving diesel exhaust fluid;
      an insert disposed within and connected to the inlet tube;
      a calibration sleeve disposed within the inlet tube in proximity to the insert;
      wherein as the diesel exhaust fluid freezes, the diesel exhaust fluid expands and is directed into the insert by the calibration sleeve;
      a filter assembly disposed in the insert, the filter assembly comprising a body portion and a filter portion connected to the body portion;
      wherein the diesel exhaust fluid flows through the body portion and the filter portion prior to flowing through the calibration sleeve;
      a retention feature formed as part of the insert; and
      a ledge portion formed as part of the insert;

wherein the body portion of the filter assembly is located between the retention feature and the ledge portion when the filter assembly is placed in the insert.

9. The apparatus of claim 8, further comprising a retention cavity formed as part of the insert, wherein a portion of the filter assembly is disposed in the retention cavity.

10. The apparatus of claim 9, further comprising a central cavity formed as part of the insert, the central cavity being adjacent the retention cavity, wherein the filter portion is at least partially disposed in the central cavity when the filter assembly is disposed in the insert.

11. The apparatus of claim 8, wherein the filter assembly is disposed entirely within the insert.

12. The apparatus of claim 8, wherein the retention feature flares radially inwardly and has a retention surface which contacts the body portion of the filter assembly such that a diameter of the retention surface is smaller than a diameter of the body portion of the filter assembly.

13. An injector having an insert to prevent a change in operation of the injector due to the freezing of diesel exhaust fluid, comprising:
    an inlet tube configured for receiving diesel exhaust fluid;
    a pole piece disposed in the inlet tube;
    a calibration sleeve partially disposed in the pole piece;
    an insert disposed in the inlet tube, in contact with the calibration sleeve;
    wherein as the diesel exhaust fluid freezes, the diesel exhaust fluid is directed from the calibration sleeve through the insert;
    a filter assembly disposed in the insert; and
    a retention cavity formed as part of the insert;
    wherein a portion of the filter assembly is disposed in the retention cavity when the filter assembly is disposed in the insert;
    a retention feature formed as part of the insert;
    a ledge portion formed as part of the insert such that the ledge portion is part of the retention cavity; and
    a body portion being part of the filter assembly;
    wherein the body portion of the filter assembly is located between the retention feature and the ledge portion when the filter assembly is placed in the insert.

14. The injector having an insert to prevent a change in operation of the injector due to the freezing of diesel exhaust fluid of claim 13, wherein the calibration sleeve is connected to the pole piece through a press-fit connection.

15. The injector having an insert to prevent a change in operation of the injector due to the freezing of diesel exhaust fluid of claim 13, further comprising:
    a lower aperture formed as part of the calibration sleeve; and
    a central aperture formed as part of the insert;
    wherein the diesel exhaust fluid in the lower aperture creeps through the central aperture as the diesel exhaust fluid freezes.

16. The injector having an insert to prevent a change in operation of the injector due to the freezing of diesel exhaust fluid of claim 15, wherein the lower aperture is approximately the same diameter as the central aperture.

17. The injector having an insert to prevent a change in operation of the injector due to the freezing of diesel exhaust fluid of claim 15, further comprising:
    a receiving cavity formed as part of the insert in proximity to the central aperture;
    wherein a portion of the calibration sleeve extends into the receiving cavity when the insert and the calibration sleeve are disposed in the inlet tube, such that the calibration sleeve contacts the insert, and the lower aperture is in substantial alignment with the central aperture.

18. The injector having an insert to prevent a change in operation of the injector due to the freezing of diesel exhaust fluid of claim 13, further comprising:
    a central cavity formed as part of the insert, the central cavity being adjacent the retention cavity; and
    a filter portion being part of the filter assembly;
    wherein the filter portion partially extends into the central cavity when the filter assembly is disposed in the insert.

19. The injector having an insert to prevent a change in operation of the injector due to the freezing of diesel exhaust fluid of claim 13, further comprising at least one weld connection providing a connection between the insert and the inlet tube.

20. The injector having an insert to prevent a change in operation of the injector due to the freezing of diesel exhaust fluid of claim 13, wherein the filter assembly is disposed entirely within the insert, and wherein the retention feature flares radially inwardly and has a retention surface which contacts the body portion of the filter assembly such that a diameter of the retention surface is smaller than a diameter of the body portion of the filter assembly.

* * * * *